June 3, 1958 — M. S. GASPARDO — 2,837,020
PROTECTOR
Filed March 30, 1955 — 2 Sheets-Sheet 1

INVENTOR.
MARTIN S. GASPARDO
BY Moore, Prangley & Clayton
ATTORNEYS

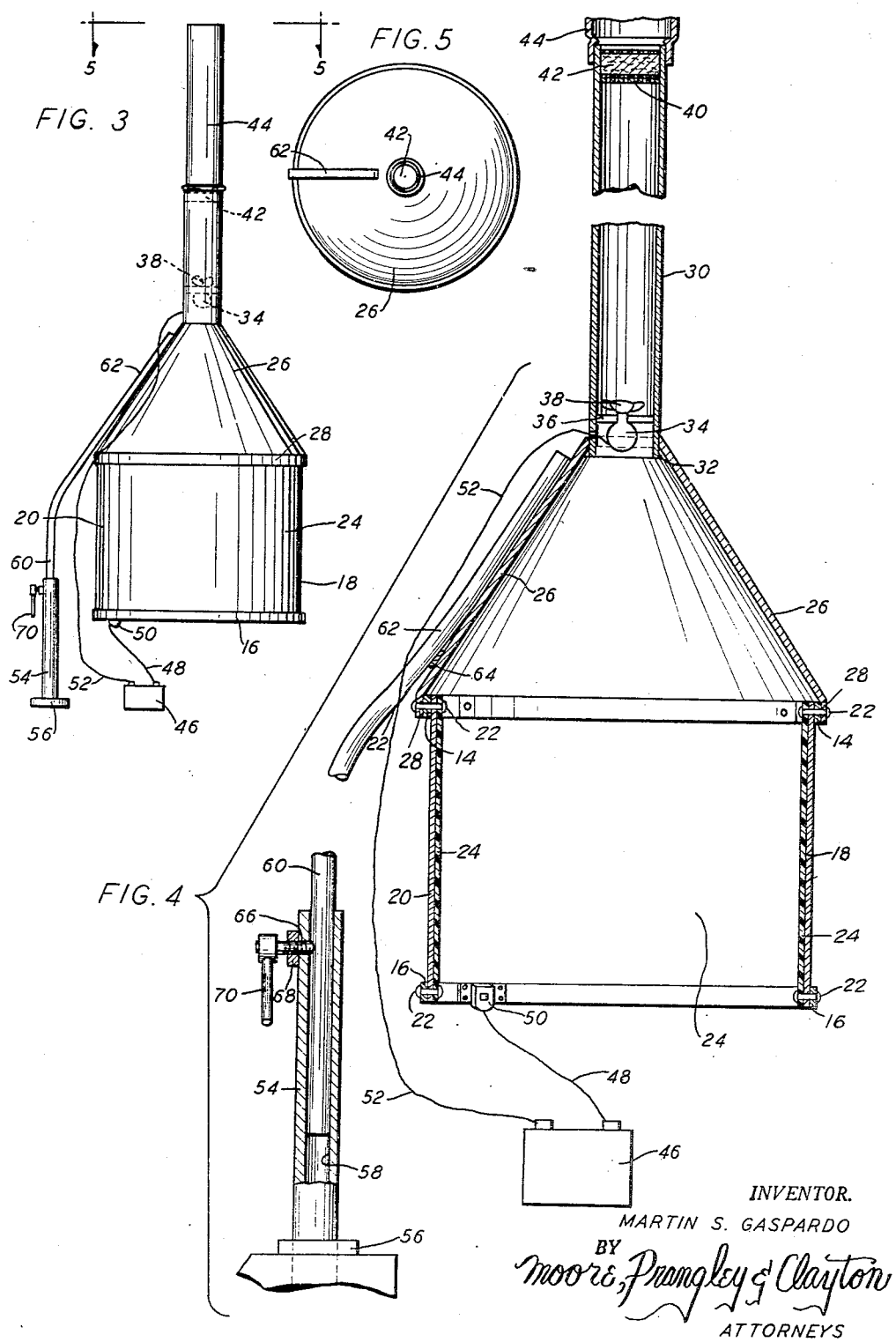

United States Patent Office 2,837,020
Patented June 3, 1958

2,837,020

PROTECTOR

Martin S. Gaspardo, Long Point, Ill.

Application March 30, 1955, Serial No. 497,855

1 Claim. (Cl. 98—115)

This invention relates to attachments for machines such as tractors, harvesters, cranes and the like, and particularly to a safety cage providing ventilation and a back rest for the operator.

The attachment of the present invention is particularly adapted to be used on tractors commonly employed on farms to draw or propel various types of farm tools and harvesting equipment including corn pickers, soybean harvesters and the like. These types of harvesting equipment often have moving parts which can be reached from the driver's seat while the tractor is in operation. Furthermore, certain of the materials being harvested such as corn, soybeans, and small grains have cornstalks, vines, weeds or the like that may tend to clog these moving parts whereby to make it desirable to remove these materials therefrom. If the driver continues driving and simultaneously attempts to remove the clogged material, he may injure or kill himself by having his hand or arm caught in the moving parts.

Tractor seats usually are not provided with back rests and this contributes to operator fatigue and discomfort. Another source of discomfort are the exhaust gases which may be blown back into the operator's face. Also the wind or the machinery being pulled may throw up dust and debris around the operator. In fact, it is not unusual for corn ears, corn stalks and the like to be thrown against the operator's arms, body and face permanently injuring him.

Accordingly, it is an important object of the present invention to provide an attachment in the nature of a safety cage to enclose the upper portion of the body of the operator including his face; more particularly it is an important object of the present invention to provide a safety cage which permits clear vision in all directions while the tractor or machine is in operation but which discourages the operator from placing his hands at dangerous points.

Another object of the invention is to provide a safety cage of the type set forth which provides a back rest and which further is adjustable to accommodate varying heights of operators and still achieve good visibility.

Still another object of the present invention is to provide a safety cage of the type set forth which protects the upper part of the body and the face of the operator from flying objects such as corn ears, stalks, soybeans, weed seeds, dirt, broken machine parts and the like and which further provides a windshield for high speed driving.

Still another object of the invention is to provide a safety cage of the type set forth provided with means to produce a stream of filtered air gathered from a high point removed from the dust along the ground and the exhaust fumes of the tractor to prevent exhaust fumes, dust and the like from being blown up underneath the safety cage about the face of the operator.

These and other objects and advantages of the invention will be better understood from the following description when taken in conjunction with the accompanying drawings. In the drawings wherein like reference numerals have been utilized to designate like parts throughout:

Figure 3 is a side elevational view of the safety cage including its mount and diagrammatically showing the connection to the source of power for the blower;

Figure 4 is a view in vertical section through the safety cage and the support therefor; and Figure 5 is a plan view of the cage of Figure 3 substantially as seen in the direction of the arrows along the line 5—5 of Figure 3.

Figures 1, 2:
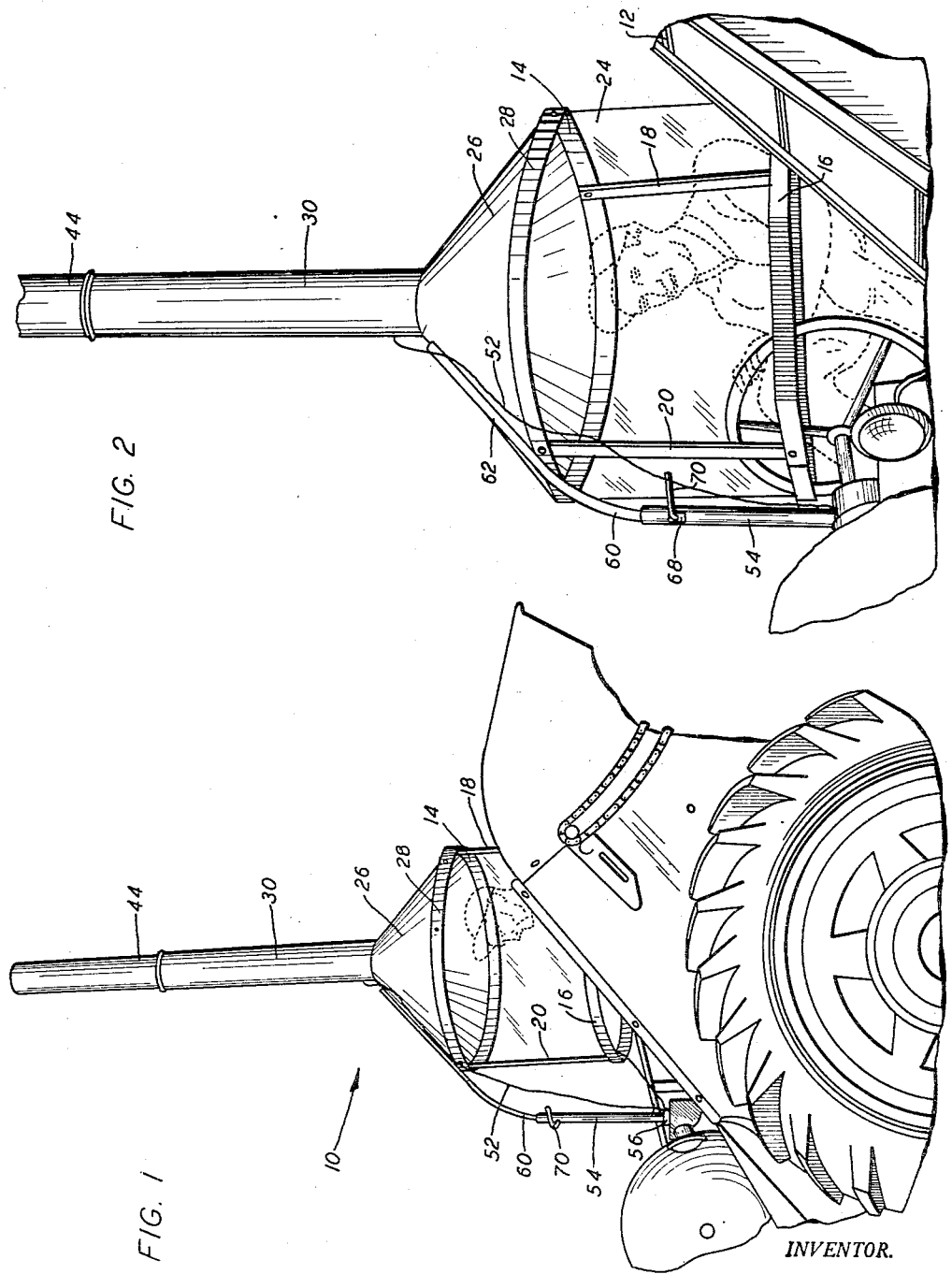
Figure 1 is a perspective view showing the safety cage of the present invention mounted on a tractor, the tractor being shown propelling a mounted corn picker.
Figure 2 is an enlarged view showing the safety cage applied to the tractor.

In Figures 1 and 2, a safety cage generally designated by the numeral 10 made in accordance with and embodying the principles of the present invention is shown applied to a tractor. The tractor further is shown as having mounted thereon and propelled thereby a corn picker including movable parts such as a conveyor 12, husking rolls, chains, sprockets, and gears which are accessible from the operator's seat on the tractor.

The cage 10 includes an upper substantially circular frame member 14 and a lower substantially circular frame member 16 which are spaced from each other by side bars 18 and 20. Frame members 14—16 and side bars 18—20 are illustrated as being made from sheet metal suitably shaped and joined in any suitable manner such as by rivets 22. Other suitable methods of connecting these members can be used such as welding, nuts and bolts, or the like. Positioned within the frame members 14—16 and secured thereto is a clear plastic shield 24 which is cylindrical in shape and extends from frame member 14 downwardly to frame member 16 and completely therearound. Any suitable clear plastic may be used to form shield 24, a preferred plastic being cellulose acetate having a thickness of about 0.030 inch. It has been found that a suitable dimension for the shield 24 is a diameter of 30 inches and a height of 20 inches. It is to be understood that other sizes and shapes of shields may be used provided they give the protection described herein.

Mounted upon upper frame 14 is conduit means including a sheet metal cone 26 which has a lower flange 28 (see Figure 4) suitably secured as by the rivets 22 to the upper frame member 14. Cone 26 also preferably has a diameter of approximately 30 inches to match the diameter of the cylindrical shield 24 and has a height of approximately 28 inches. A preferred material of construction for cone 26 is a 26 gauge sheet metal which is also suitable for forming frame members 14—16 and side bars 18—20.

Mounted upon cone 26 and interconnecting therewith is a section of pipe 30 which is also formed of sheet metal and preferably has a diameter of about 5½ inches. The lower end of pipe 30 is suitably secured to cone 26 as by welding at point 32. Mounted within the lower end of pipe 30 is an electrical motor 34 suitably secured to the walls of pipe 30 by vanes 36. Motor 34 is operatively connected to and drives a fan 38 which is shaped and rotates in a direction to draw air downwardly through pipe 30 into cone 26 and about the head of the operator positioned within shield 24.

Positioned at the upper end of pipe 30 is a screen 40 which is suitably secured to the walls of pipe 30 as by welding. Positioned upon screen 40 is an air filter 42 which is preferably of the spun glass type.

In certain instances, it is desirable to draw air from a higher point above the ground and to this end there is provided a second pipe 44 which fits upon the upper end of the pipe 30.

Power for driving the fan motor 34 is preferably derived from a battery such as battery 46 which may be part of the equipment of the tractor upon which the safety cage is mounted. One terminal of the battery is grounded in the usual manner by a lead 48 from the negative terminal of the battery to a switch 50 mounted on lower frame member 16. The positive terminal of the battery 46 is connected by a lead 52 to one side of motor 34. The other side of motor 34 is grounded to pipe 30 and cone 26 whereby to complete the electrical circuit for motor 34.

It is desirable that the safety cage 10 be raised when the operator leaves the tractor and lowered around his head when he seats himself on the tractor prior to beginning operation. It further is desirable that the height of the cage with respect to the seat of the tractor be adjustable to accommodate varying heights of operators. To this end an adjustable mounting for the cage 10 upon the tractor has been provided. More specifically, a mounting pipe 54 is provided which is fixedly secured to the tractor as by a mounting plate 56. Pipe 54 has a circular aperture 58 therein adjustably to receive a telescoping pipe 60. The upper end of pipe 60 is bent to form an attachment portion 62 which is secured as by welding at point 64 to cone 26. Adjustment of the position of pipe 60 with respect to pipe 54 is achieved by a threaded bolt 66 which passes through an aperture in the wall of pipe 54 and threadedly engages a nut 68 welded on pipe 54. A handle 70 is provided on bolt 66 to facilitate its adjustment.

When the operator first seats himself upon the tractor, the safety cage 10 is preferably in an elevated position. The operator then grasps handle 70 and lowers the shield to a comfortable position. The shield is then held in this position by tightening bolt 66 using handle 70. Switch 50 is then turned on whereby to begin operation of fan motor 34. Fan 38 begins to pull air downwardly through pipe 44, filter 42 and pipe 30 and blows the air about the head of the operator. This air is clean and fresh since it is drawn from a point spaced far from the exhaust fumes and from the dirt and debris which is thrown up along the ground. Furthermore, the air has been filtered by filter 42 to remove any dust and other particles therefrom. The downward flow of air driven by fan 38 in addition to introducing fresh air within cone 26 and shield 24, prevents dust, exhaust fumes, and the like from being blown upwardly underneath shield 24 and about the driver's face. As a result of operation of fan 38, the operator can breathe comfortably and his vision is not obscured by dust and the like.

The safety cage 10 also serves as a back rest for the operator if he desires to lean backwards against it.

Vision is good in all directions because of the large expanse of transparent plastic shield 24. Shield 24 also protects the face of the driver from flying debris such as corn ears, cornstalks, soybeans, weed seeds, dirt, machine parts and the like in addition to acting as a windshield for high speed driving.

Another important advantage of the shield is the safety which it encourages. This results from the fact that the operator cannot conveniently reach moving parts of the implement being carried or drawn such as conveyor 12 of Figure 2 while the safety shield is in operative position. Accordingly, the operator is encouraged to stop his vehicle, raise the safety shield and then remove any clogging debris from the machinery which is stopped and non-operating.

Although a preferred form of the invention has been shown for purposes of illustration, it is to be understood that various changes and modifications can be made therein without departing from the spirit and scope of the present invention. Accordingly, the invention is to be limited only as set forth in the following claim.

What is claimed is:

A safety cage for a machine such as a tractor, harvester, crane or the like, comprising, a frame, said frame including an upper substantially cylindrical frame member and a lower substantially cylindrical frame member, a pair of side bars interconnecting said frame members to hold them in spaced apart relation, a substantially cylindrical and transparent shield member connected to said frame members positioned completely to surround the head and shoulders and upper arms and upper portion of the back of an operator, a cone, means attaching said cone to said upper frame member, a pipe mounted upon said cone and extending upwardly therefrom and communicating with the area within said shield member and said cone, a fan mounted in said pipe to draw air from the upper end of said pipe and force it into the area confined by said shield member and downwardly and out from under the edge of said shield member, and adjustabble mounting means for mounting said cone and the attached shield member on a machine about the head and shoulders and upper arms and upper portion of the back of an operator, said shield member in adjusted position permitting ready access of the operator's hands to the machine controls within said shield member and providing a back rest for the operator.

References Cited in the file of this patent

UNITED STATES PATENTS

| | | |
|---|---|---|
| 2,434,752 | Waller | Jan. 20, 1948 |
| 2,436,508 | Fairbanks | Feb. 24, 1948 |
| 2,627,217 | Hainke et al. | Feb. 3, 1953 |